March 12, 1940.  A. EISELE  2,192,900
GAUGE
Filed June 9, 1938  2 Sheets-Sheet 1
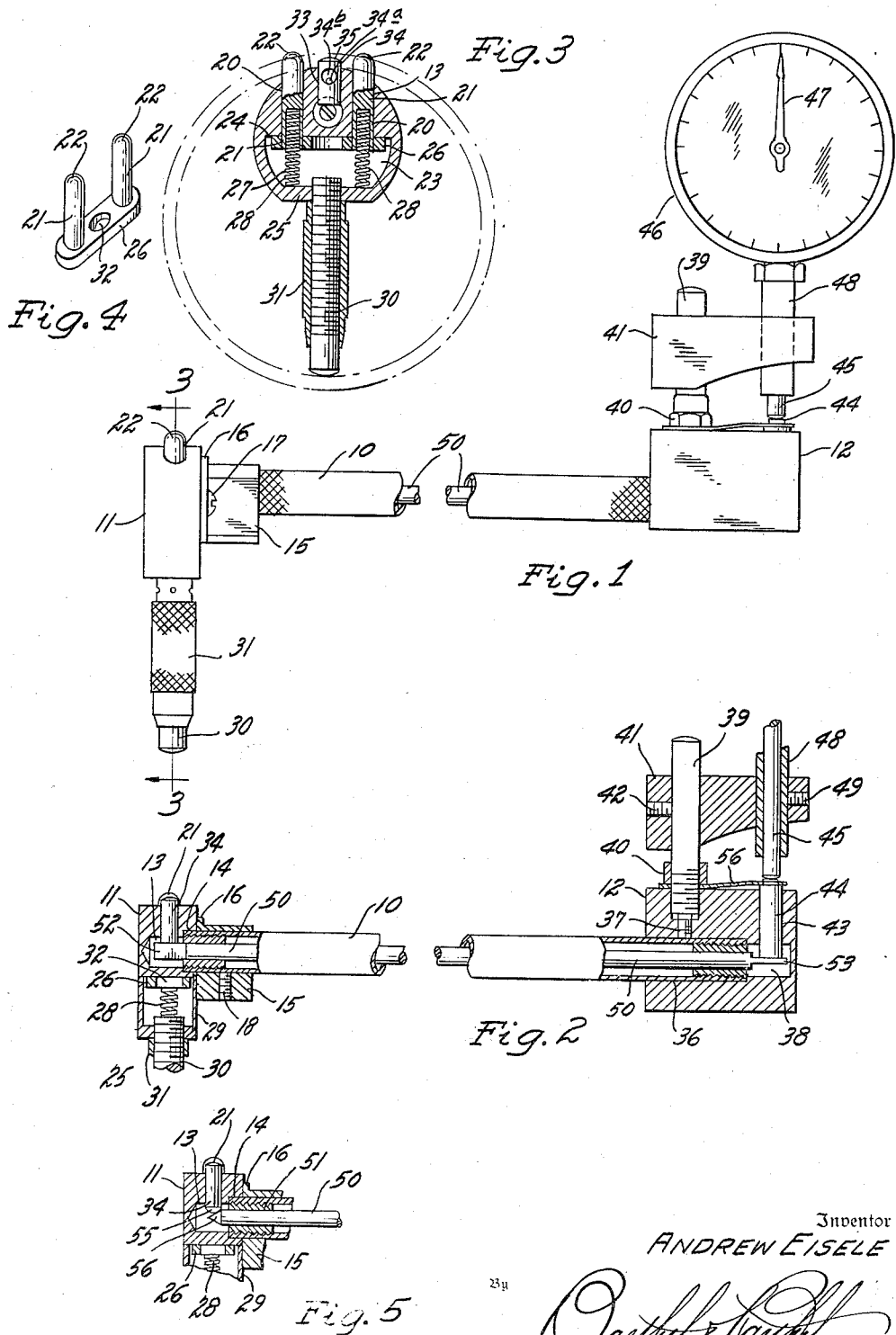
Inventor
ANDREW EISELE
By
Barthel & Krauth
Attorneys March 12, 1940. A. EISELE 2,192,900
GAUGE
Filed June 9, 1938 2 Sheets-Sheet 2
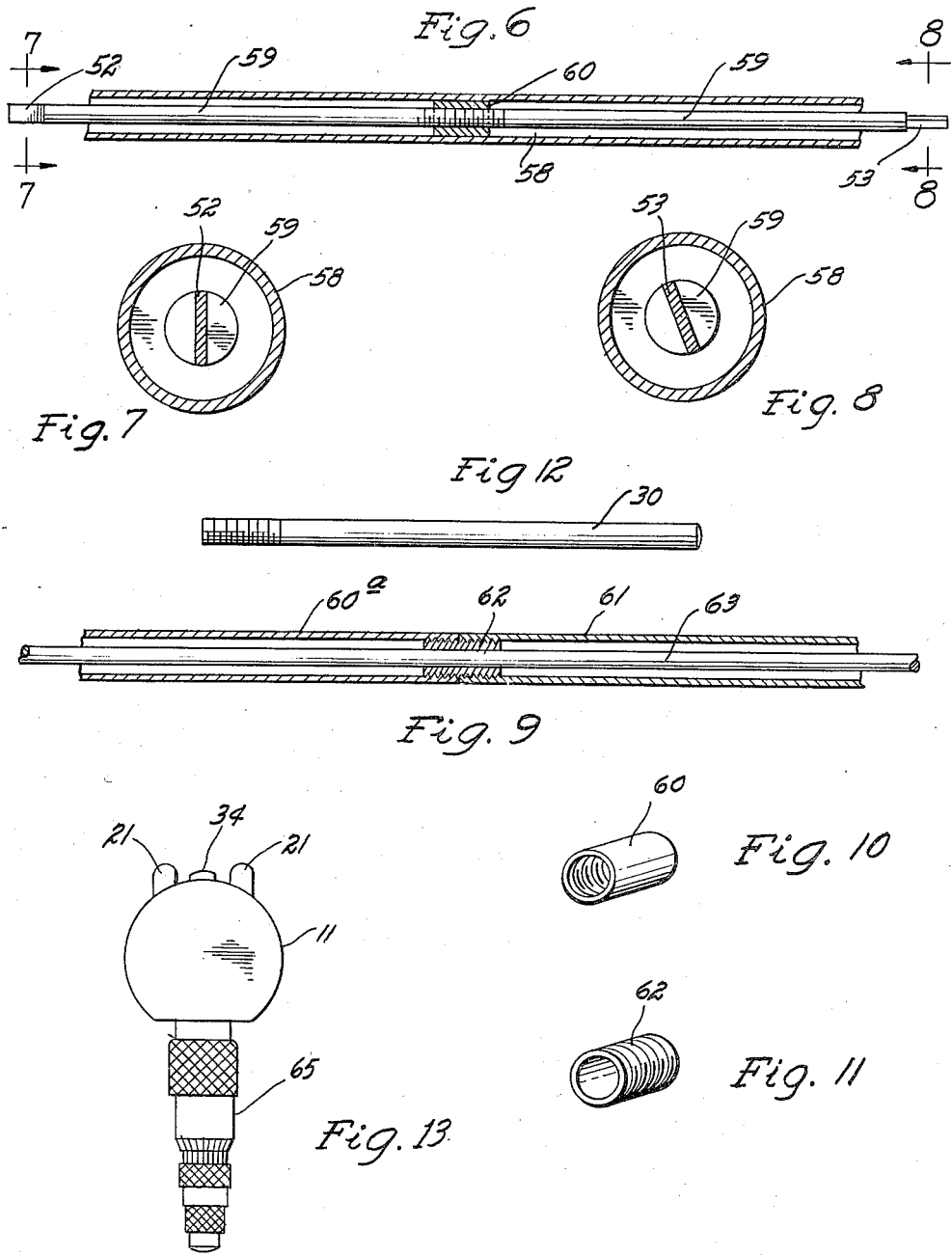

Patented Mar. 12, 1940

2,192,900

UNITED STATES PATENT OFFICE 2,192,900

GAUGE

Andrew Eisele, Detroit, Mich.

Application June 9, 1938, Serial No. 212,649

3 Claims. (Cl. 33—178)

This invention relates generally to gauges and more particularly to gauges for directly and quickly indicating variations in the internal diameter of a deep bore.

One of the objects of this invention is to provide a gauge of new and improved construction for accurately determining any variations in size of a bore.

Another object of the invention is to provide a gauge which may be easily and readily adjusted for testing bores of various depths and diameters.

Other objects of the invention will become apparent from the following detail description taken in connection with the accompanying drawings in which:

Figure 1 is a view in side elevation of my improved gauge;

Fig. 2 is a side view of the gauge having parts broken away and in section;

Fig. 3 is a view shown in cross section taken along the line and in the direction of the arrows 3—3 of Fig. 1;

Fig. 4 is a perspective view of a detail part of the gauge;

Fig. 5 is a fragmentary view shown in section of a modification;

Fig. 6 is a fragmentary view of certain parts of the device shown partly in section and partly in elevation;

Fig. 7 is an end view taken in the direction of the arrows 7—7 of Fig. 6;

Fig. 8 is an end view taken in the direction of the arrows 8—8 of Fig. 6;

Fig. 9 is a view showing a modified form of the arrangement shown in Fig. 6;

Fig. 10 is a perspective view of a part of the structure shown in Fig. 6;

Fig. 11 is a perspective view of a part of the structure shown in Fig. 9;

Fig. 12 is a view in side elevation of a rod employed in the device, and

Fig. 13 is an end view of a modified form of gauge.

Referring to the drawings by characters of reference, the gauge includes an open ended tube 10 on one end of which is mounted a feeler body 11 and on the other end of which is mounted a gauge body 12, the body 12 also serving as a handle for holding the instrument. The body 11 is preferably a narrow, generally cylindrical body for insertion in a bore to be tested and is provided with a bored recess 13 which is located off center of the body and opens at one side thereof having a counterbore 14 to receive one end of the tube 10 which abuts the internal outwardly facing shoulder of the counterbore. Surrounding the tube 10, a collar 15 is provided with a flange 16 having apertures to receive screws 17 for rigidly securing the collar and body 11 together and threaded into the collar 15 is a set screw 18 engaging the tube 10 to hold the same rigid to the collar and therefore rigid to the body 11.

The body 11 is provided with a pair of spaced parallel bores 20, transverse to bore 13, which open through the outer cylindrical surface of the body and slidably receive and guide a pair of integral pins 21 which project externally of the body 11 and have their outer ends rounded, as at 22, for engagement with the wall surface of a bore to be tested. Below the bore 13, as seen in Fig. 3, the body 11 is hollow having a closure 23 formed in part by an inner wall 24 and an outer flattened wall 25 and in the chamber 23 is a plate member 26 with which the guide pins 21 are integral. Through the plate 26 and into the pins 21 longitudinally thereof are provided bores 27 to receive helical coil springs 28 which at their lower ends seat and may be fixed to the outer flattened wall 25, the springs 28 yieldingly urging the pins 21 outwardly, limited by engagement of the plate 26 with the inner wall 24. Access to the chamber may be had through an opening in a wall thereof, the opening being closed by a sliding closure plate 29, Fig. 2.

Threaded into the flattened outer body wall 25 is a threaded rod 30 which is positioned between the pins 21 and extends in an opposite direction thereto having its outer end rounded, as at 31, to engage the wall surface of a bore. Threaded over the rod 30 is an open ended tubular member one end of which engages the body wall 25 locking the threaded rod against movement relative to the body. It will be seen that the rod 29 is adjustably screwthreaded into the body 11 and that interchangeable rods of various lengths, one of which is shown in Fig. 12, may be provided to accommodate bores of various diameters. Thus the body 11 carries a yieldably spring pressed member having two integral spaced contact members and a relatively fixed contact member providing a three point feeler member for insertion in a bore. As shown in Figs. 3 and 4 the plate 26 may be provided intermediate the pins 21 with a clearance aperture 32 to receive the inner end of the rod 30.

Between the spring pressed guide pins 21, the body 11 is provided with a bore 33 which at one end opens through the outer cylindrical surface of the body and at its other or inner end intersects the more 13 transverse thereto. Slidably received and guided in the bore 33 is a reciprocal feeler pin 34. The feeler pin 34 has one or its inner end projecting into the bore 13 and its other or outer end projecting externally of the body, the outer end of the pin 34 being rounded, as at 35, to decrease friction with the wall surface of a bore to be tested. The feeler member 34 is limited in its reciprocal movement by a transverse pin 34a fixed in the body and engaging in a slot 35b in the feeler member which keeps the feeler member from falling out of the body.

The other body, or body 12, is provided with a bore 36 to receive an end portion of the tube 10 which is held thereto by a set screw 37, the bore 36 having a reduced portion 38 provided with an outwardly facing shoulder against which the end of the tube abuts. Threaded into the body 12, a rod 39 is locked against movement by a nut 40 screwed down against an outer wall of the body, and mounted on the rod 39, a guide and support 41 may be secured to the rod by a set screw 42. The body 12 is provided with a bore 43 opening at one end thereof through one outer wall of the body and at its other end intersecting bore 34 transverse thereto, the bore 43 slidably receiving a reciprocal pin 44. The pin 44 projects at one, or its inner end into the bore 38 and at its other end projects externally of the body and abuts end to end with a reciprocal rod 45 which operates a gauge or indicator 46. The indicator shown is a well known device having a dial and movable pointer 47 which is biased to zero reading by a spring (not shown). The reciprocal gauge rod 45 is slidably received and guided in a tube or sleeve 48 held in an aperture in the support 41 by a set screw 49.

A rotatable shaft or rod 50 operatively connects the feeler pin 34 and the gauge operating pin 44 and is rotatably supported within the tube 10 by tubular inserts 51 which may be screwthreaded into opposite ends of the tube 10. End portions 52 and 53 of the shaft 50 are flattened providing cams which respectively engage the lower end of the feeler pin and the lower end of the gauge actuating pin 44, the flattened cam portions or surfaces extending at relatively different angles. As illustrated in Fig. 5 the feeler pin and also the gauge operating pin may be provided with rounded lower ends 55 to engage conical ends 56 of the rod 50 in which case the rod 50 would be moved longitudinally instead of rotatably in transferring movement of the feeler pin to the gauge operating pin.

The aforementioned spring of the indicator 46 acts to rotate the rod in a direction to move the feeler pin 34 outwardly but to insure such movement I provide a tensioned leaf spring 56 secured at one end thereof to the body 12 under the nut 40, the other or free end of the spring 56 abutting and acting downwardly on a shoulder 57 provided on the gauge operating pin 44.

It will be seen that the herein described instrument can be very easily and readily inserted in a bore to test the perfection of the same and that any discrepancies will be readily indicated to the operator by the indicator 46. In the testing of a bore for uniformity throughout its length, a decrease in bore size is encountered, the feeler pin 34 will be pressed inwardly of the body 11 rotating connecting rod 50 which will move pin 44 and rod 45 outwardly operating the gauge which readily indicates the discrepancy in the bore size. Conversely, if the bore tester is oversize, spring 56 aided by the indicator spring will move pin 44 inwardly, rotating rod 50 until limited by engagement of the feeler pin 34 with the wall of the bore, the error being indicated by the indicator 46.

For deeper bores a longer tube 58, Fig. 6, and two connecting rods 59, may be connected together by an internally threaded open ended tubular member 60 having a sliding fit with the inner wall surface of the tube 58. In Fig. 9 is shown two outer tubes 60a and 61 connected together in end to end abutting relation by an open ended tubular insert 62 threaded into the opposed ends of the tubes and slidably receiving a connecting rod 63 which operatively connects the feeler member and gauge. From the above it will be seen that any number of interchangeable tubes and rods may be employed for reaching into bores of various depths and that for deeper bores the rods and their outer covering tubes may be joined together as above pointed out.

In Fig. 13 is shown the feeler end of the device having instead of the rod 30, a micrometer to provide for accurate setting of the size bore to be tested. The micrometer is of the conventional so-called barrel type.

What I claim is:

1. In a device for testing the uniformity of a bore, an open ended tube, a body mounted on one end of said tube for insertion in the bore, a pair of spaced integral contact members to engage the wall surface of the bore, spring means urging said contact members outwardly of said body, an adjustable contact member carried by said body to engage the bore surface and extending therefrom in a direction opposite to said integral contact members, a body mounted on the other end of said tube, an indicator carried by said second-named body, a movable feeler member carried by said first-named body to actuate said indicator, a rod slidably rotatable within said tube, and cam means on opposite ends of said rod respectively engaging said feeler member and said movable member.

2. In a device for testing the uniformity of a bore, a tube, a body mounted on one end of said tube for insertion in the bore, a feeler member to engage the bore surface and carried by and movable relative to said body, guide means carried by said body to engage the bore surface, a second body mounted on the other end of said tube, a gauge indicator mounted on said second-named body, a movable member in said second-named body and operatively connected to said gauge, a rotatable connecting rod operatively connecting said feeler member and said movable member, and spring means acting to rotate said rod in a direction yieldably opposing rotation of the rod by said feeler member.

3. In a device for testing the uniformity of a bore, a tube, a body mounted in one end of said tube for insertion in the bore, a feeler member to engage the bore surface and carried by and movable relative to said body, guide means carried by said body to engage the bore surface, a second body mounted on the other end of said tube, a gauge indicator mounted on said second-named body, a movable member in said second-named body and operatively connected to said gauge, said movable member being movable transversely of said tube, a rotatable rod in said tube and having flattened end portions at relatively different angles radial to the longitudinal axis of said rod, said flattened portions providing cam means respectively engaging said movable member and said feeler member.

ANDREW EISELE.